(12) United States Patent
Zinanti

(10) Patent No.: US 6,508,335 B2
(45) Date of Patent: Jan. 21, 2003

(54) OMNI-DIRECTIONAL WHEEL SITH FRICTIONAL BIAS

(76) Inventor: Michael David Zinanti, 6045 W. 39$^{th}$ Ave. #2, Wheat Ridge, CO (US) 80033

( * ) Notice: Subject to any disclaimer, the term of this patent is extended or adjusted under 35 U.S.C. 154(b) by 0 days.

(21) Appl. No.: 09/839,029

(22) Filed: Apr. 23, 2001

(65) Prior Publication Data

US 2002/0153205 A1 Oct. 24, 2002

(51) Int. Cl.$^7$ ............................................. B60B 33/00
(52) U.S. Cl. ...................................... 188/1.12; 280/843
(58) Field of Search ........................... 280/11.19, 11.22, 280/11.23, 11.25, 11.27, 842, 843

(56) References Cited

U.S. PATENT DOCUMENTS

| | | | | |
|---|---|---|---|---|
| 3,963,251 A | * | 6/1976 | Miano | 280/11.3 |
| 5,409,265 A | * | 4/1995 | Douglass | 280/11.27 |
| 6,065,762 A | * | 5/2000 | Brelvi | 280/11.226 |

* cited by examiner

Primary Examiner—Jack Lavinder
Assistant Examiner—C. T. Bartz
(74) Attorney, Agent, or Firm—Scott L. Terrell, P.C.; Scott L. Terrell

(57) ABSTRACT

An omni-directional wheel is provided which includes a frame having an upper portion for affixing the frame to an under-side of a weight bearing surface, at least two side walls, and a central cavity defined by the side walls for receiving at least one spherical wheel, at least two wheel bearings connected in axial alignment to the side walls for rotation of the wheel about a fixed axis, at least two wheel seats each having one side in axial connection to the wheel bearings and an opposite conical face wherein the conical faces are disposed in opposite axial alignment for mounting the wheel between the faces and a force of static friction is exerted relative to the conical faces and the wheel when the wheel is rotating about the fixed axis and a force of kinetic friction is exerted relative to the conical faces and the wheel when the wheel is rotating about an axis perpendicular to the fixed axis, and an upper load bearing connected to the frame which bias against an upper surface of the wheel.

15 Claims, 3 Drawing Sheets

OMNI-DIRECTIONAL WHEEL SITH FRICTIONAL BIAS

CROSS REFERENCE TO RELATED APPLICATIONS

Not Applicable.

BACKGROUND OF THE INVENTION

1. Field of the Invention

The present invention relates to multidirectional wheels. In particular, it relates to an omni-directional roller skate wheel which allows the user to initiate motion, brake, or stop by turning the skate transverse to the direction of travel.

2. Description of the Related Art

Roller skate wheels are well known. However, conventional roller skates are not designed to operate in a manner which allows an effective simulation of the mechanics of motion a skater experiences when ice skating. As a result, efforts have been made to design multidirectional wheel assemblies for roller skates. For example, in the related art, U.S. patent Ser. No. 6,065,762, issued to Brelvi, provides a multidirectional in-line roller skate having a wheel frame secured to the bottom surface of the skate and a plurality of spherical wheels. The spherical wheels can rotate horizontally along a riding surface and vertically three hundred and sixty degrees in a clock wise and counter clockwise direction upon the riding surface. When mounted on the sole of a skate shoe the spherical wheels allow the skater to perform tight figure skating maneuvers on the riding surface. However, while Brelvi, and the patents cited therein, teaches a wheel assembly which allows the skater to use a forward and lateral motion, they do not teach skate assemblies which provide the initiation of acceleration or breaking by turning the skate transverse to the direction of travel as one experiences when ice skating.

U.S. Pat. No. 5,246,238, issued to Brown, discloses a single axis roller skate wheel useful for breaking upon the application of a lateral force by the skater against the riding surface. The wheel is constructed for rolling in both the forward and lateral directions of the skate. A plurality of rollers are mounted on the wheel hub, each roller rotatable about an axis tangential to a circle on the wheel axis. The rollers conform to a second circle on the wheel axis for contact with a skating surface. Application of friction to the rollers controls the resistance to lateral rolling, thus providing a braking action to the skater. However, the Brown wheel assembly is limited in practical application because of its single axis nature and the complex configuration of the rollers about the periphery of the wheel.

Thus, what is needed is an omni-directional wheel assembly for a skate or board which provides a frictional bias in the forward and backward motion over the side-to-side motion and which is useful for the user to initiate motion, brake, or stop by turning the skate or board transverse to the direction of travel. The present invention satisfies this need.

BRIEF SUMMARY OF THE INVENTION

It is therefore an object of the invention to provide an omni-directional wheel having a frictional bias which favors a forward and backward motion over a side-to side motion.

It is another object of the invention to provide an omni-directional roller skate having a frictional bias in favor of a forward and backward motion over a side-to-side motion where the magnitude of the frictional bias is adjustable in order to meet the needs of the particular skater relative to the playing surface.

It is another object of the invention is to provide an omni-directional wheel assembly which allows roller skaters, skate boarders, and scooter riders to brake, slow-down, or stop by turning their skates or riding surfaces in a direction transverse to the forward and backward direction of travel.

It is a further object of the invention to provide a roller skate which enables the skater to more closely emulate the mechanics of motion experience when ice skating.

To overcome the problems of the prior art methods and in accordance with the purpose of the invention, as embodied and broadly described herein, briefly, an omni-directional wheel is provided which includes a frame having an upper portion for affixing the frame to an under-side of a weight bearing surface, at least two side walls, and a central cavity defined by the side walls for receiving at least one spherical wheel, at least two wheel bearings connected in axial alignment to the side walls for rotation of the wheel about a fixed axis, at least two wheel seats each having one side connected to the wheel bearings and an opposite conical face wherein the conical faces are disposed in opposite axial alignment for mounting the wheel between the faces and a force of static friction is exerted relative to the conical faces and the wheel when the wheel is rotating about the fixed axis and a force of kinetic friction is exerted relative to the conical faces and the wheel when the wheel is rotating about an axis perpendicular to the fixed axis, and an upper load bearing connected to the frame which bias against an upper surface of the wheel.

Additional advantages of the present invention will be set forth in part in the description that follows and in part will be obvious from that description or can be learned from practice of the invention. The advantages of the invention can be realized and obtained by the apparatus particularly pointed out in the appended claims.

BRIEF DESCRIPTION OF THE SEVERAL VIEWS OF THE DRAWINGS

The accompanying drawings, which are incorporated in and which constitute a part of the specification, illustrate at least one embodiment of the invention and, together with the description, explain the principles of the invention.

DETAILED DESCRIPTION OF THE DRAWINGS

Unless specifically defined otherwise, all technical or scientific terms used herein have the same meaning as commonly understood by one of ordinary skill in the art to which this invention belongs. The invention operates to provide omni-directional rotation of the skate wheel relative to the frame with a frictional bias in favor of the forward and backward motion of the skater over a side-to-side motion. Thus, certain physical principles of friction are discussed herein solely as an aid, and not by way of limitation, to further an explanation of the invention.

Although any methods and materials similar or equivalent to those described herein can be used in the practice or testing of the present invention, the preferred methods and materials are now described. Reference now will be made in detail to the presently preferred embodiments of the invention, examples of which are illustrated in the accompanying drawings.

Figure 1:
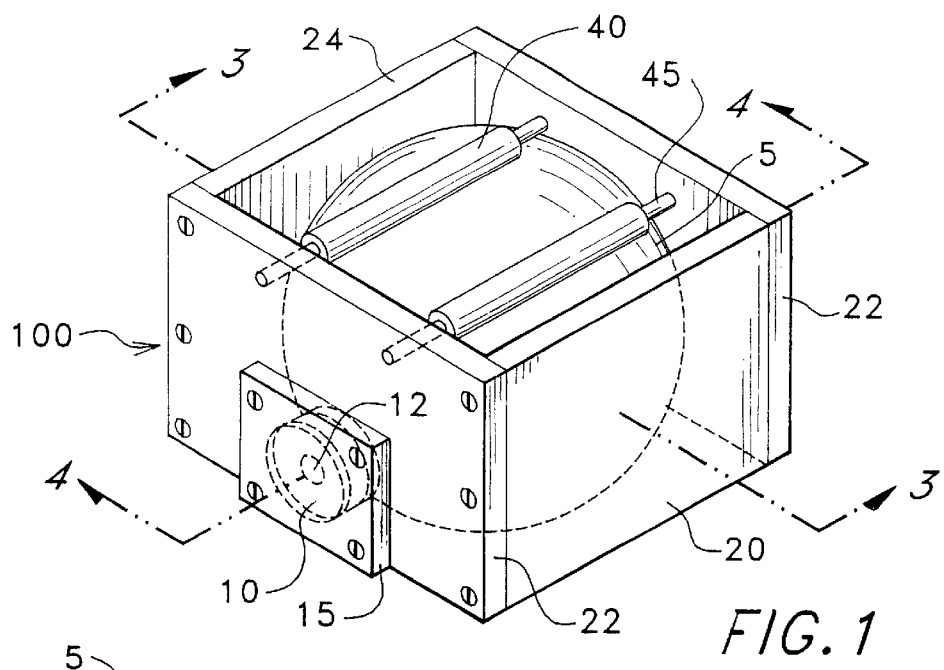
FIG. 1 is an isometric view of an embodiment of the wheel assembly according to the present invention.

Referring now to the drawing figures, wherein like numerals represent like features, it is generally shown in FIG. 1 an isometric view of an embodiment of the wheel assembly 100 according to the present invention. In the figure, wheel bearings 10 are mounted to the side walls 22 of the frame 20. Wheel bearing support members 15 maybe, but need not, used to assist in the mounting the wheel bearings 10 to the side walls 22. The wheel bearings 10 are conventional, such as roller blade ball bearings, and include a bearing cage having a central opening 12 for receiving an axle. The wheel bearings 10 are used to provide the free rolling rotation of the wheel 5 about axis 4. Load bearings, such as a low friction rollers 40, are rigidly mounted to the frame 20 and are used to support the weight of the skater against the wheel 5 and playing surface. In the illustrated embodiment, the rollers 40 are preferably mounted to the side walls 22 of the frame 20 circumferentially about a weight bearing rod 45 and are either covered with, or made of, a low friction polymer.

Referring now to FIGS. 1 to 4, FIG. 2 illustrates a top view of the embodiment as shown in FIG. 1. Here, one can observe an embodiment whereby the wheel seats 30 include a flange portion 32, opposite a conical face 34. The flange 32 is preferably pressed into the central axle opening 12 of the wheel bearing 10 cage. The conical faces 34 bias inwardly against the wheel 5 surface. In this manner, the wheel seat 30 serves as an axle for rotation of the wheel 5 about axis 4, of FIG. 1, when the skater is moving in a forward or backward direction.

Figure 2:
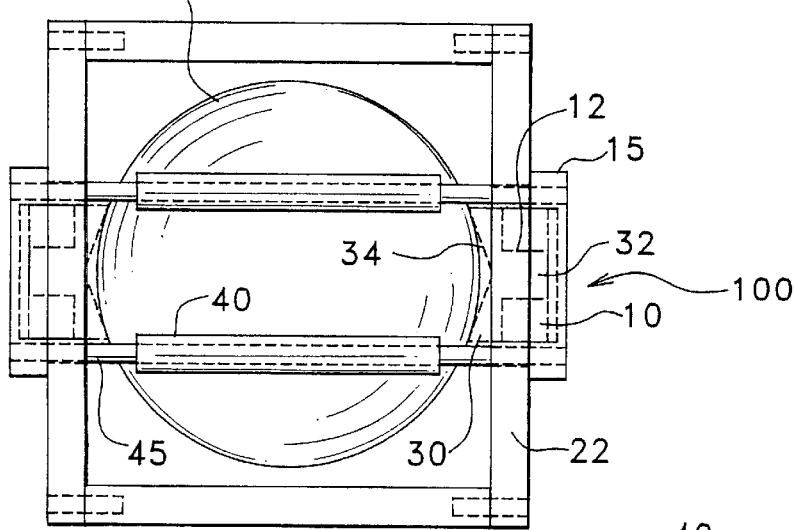
FIG. 2 is a top view of the embodiment shown in FIG. 1.
Figure 3:
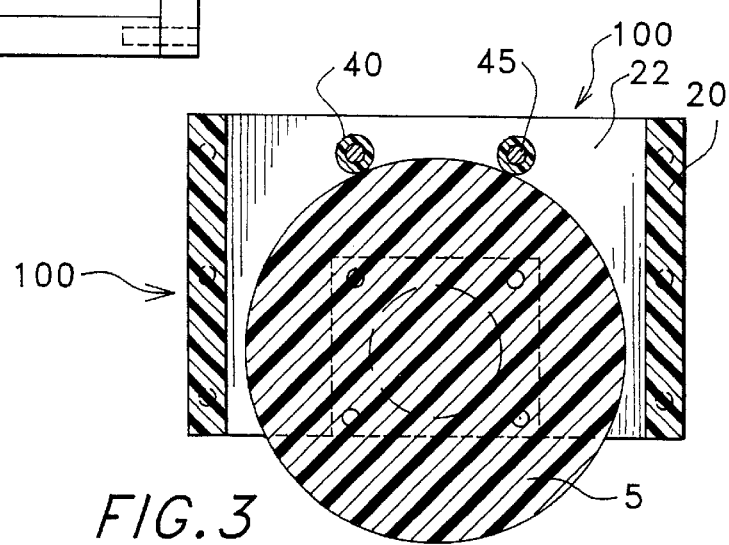
FIG. 3 is a cross-sectional side view of the embodiment shown in FIG. 1.
Figure 4:
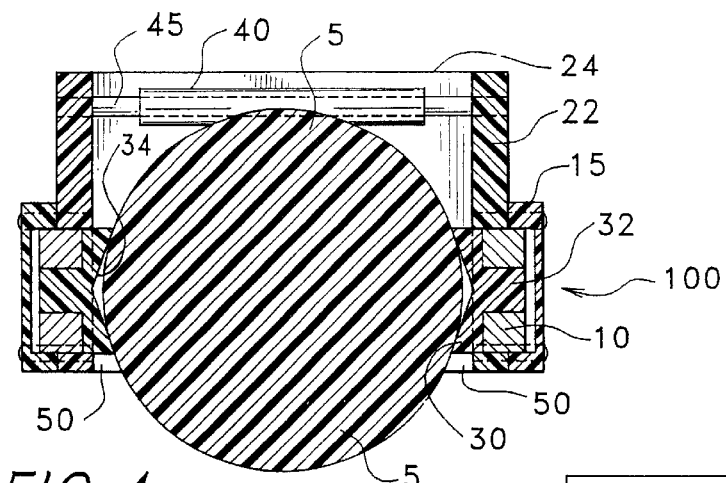
FIG. 4 is a cross-sectional frontal view of the embodiment shown in FIG. 1.

FIGS. 3 and 4 show cross sectional views of the embodiment illustrated in FIGS. 1 and 2. Here, skate assembly 100 includes a frame 20 having an upper portion 24 for affixing the frame 20 to the under-side of a weight bearing surface (not shown), such as the sole of a skate boot, at least two side walls 22, and a central cavity defined by the side walls 22 for receiving at least one spherical wheel 5. The exact configuration of the frame construction is not critical to the invention and is simply a matter of design choice. For example, the frame 20 can be constructed of light weight series 700 aluminum, carbon fiber, or other material and can be attached to the sole of a skate boot, skate board, or scooter, using bolts, screws, rivets, or any other fastener commonly used for fastening. roller skate wheels to these surfaces. Preferably, the frame 20 is mounted to the sole of a skate shoe in a manner that allows for easy removal, repair, and replacement, of the wheel 5, wheel bearings 10, wheel seats 30, and load bearing rollers 40.

The "contact force" is the lateral force exerted by the wheel seat conical face 34 upon the wheel 5. The "force of static friction", $F_s$, is that component of the "contact force" parallel to the surfaces of the wheel seat 30 conical faces 34 and the wheel 5 when a tension is applied to the wheel 5. The "normal force", N, is that component of the "contact force" exerted normal (parallel to axis 4, of FIG. 1) to the wheel 5 surface by the wheel seat 30 conical faces 34 when a tension is applied to the wheel 5. The magnitude of the maximum value of $F_s$ depends on that of N; when the normal force increases, a greater force is required to make the wheel 5 slide in relation to the wheel seat 30 conical face 34. Generally speaking, the maximum value of $F_s$ is directly proportional to the normal force N with proportionality factor coefficient of static friction, $\mu$s. The actual force of static friction, $F_s$, can have any magnitude between zero (when there is no applied force parallel to the wheel seat 30 conical face 34 and wheel 5 pairs of surfaces) and a maximum value given by $\mu_s N$. Thus, $F_s \leq \mu_s N$. The equality sign holds only when the applied force T, parallel to the wheel seat 30 conical face 34 and wheel 5 surfaces, has such a value that omni-directional rotation of the wheel 5 is about to start. When T is less than this value, the inequality sign holds and the magnitude of the friction force must be computed from the conditions of equilibrium. As soon as omni-directional rotation of the wheel 5 begins, it is found that the friction force decreases. This new friction force, for the wheel seat 30 conical face 34 and wheel 5 pairs of surfaces, also depends on the magnitude of the normal force, and again it is convenient, thought not always precise, to represent the relation as a proportionality, $\mu_k$. Thus, the magnitude of the friction force $F_s$ is less than or equal to $\mu_s N$ when there is no relative motion between the wheel seat 30 conical face 34 and the wheel 5 pairs of surfaces (rotation about axis 4, FIG. 1), and $F_s$ is equal to $\mu_k N$ when rotational motion about axis 3 of FIG. 1 exists between the wheel seat 30 conical faces 34 and the wheel 5 pairs of surfaces.

The spherical wheel 5 can be fabricated from a variety of materials which are well known in the art for the manufacture of a conventional roller blade wheel. The wheels 5 desirably include an inner core of a hard material, such as steel, encased in an outer layer of a durable material, such as polyurethane. The durable material is desirably formulated to a composition which provides a desired coefficient of friction ($\mu_s$ and $\mu_k$) between the rolling surface of the wheel 5, the conical faces 34 of the wheel seats 30, and the load bearing roller 40 surfaces relative to the physical stature and performance level of the skater. The outer material of the wheel 5 may also be formulated relative to the rolling surface. For example, it is contemplated that a professional roller skater would be riding on a specially designed riding surface, and would need an outer wheel surface which is different from that which maybe desirable for an amateur skater riding primarily on cement or asphalt. Additionally, the wheel 5 should be available in a variety of outer diameters, once again, depending on the size and skill level of the skater.

The wheel bearings 10 are preferably made of stainless steel, and are mounted to the side walls 22 of the frame 20 in axial alignment so as to provide a free in-line rotation of the wheel 5 about axis 4. The exact size of the wheel bearings 10 and materials used in their construction also depends upon such factors as the desired cost, weight of the expected skater, diameter of the wheel 5 and wheel bearings 10, and the application of the wheel assembly 100. The wheel bearings 10 are preferably of a kind commonly found in the construction of conventional roller blades, so as to provide an optimum value in relation to cost, performance, wear, and smoothness in feel. Like conventional roller blade wheels, the wheel bearing 10 cage preferably includes a central opening 12 which. is used to receive an axle for rotation of the roller blade wheel about axis 4. However, unlike conventional roller blade wheels, the invention herein uses the wheel bearing 10 and wheel seat 30 combination to allow the wheel 5 to rotate about axis 3 and axis 4, of FIG. 1. The wheel seat 30 and wheel bearing 10 may be cast, machined, or molded together as a single unit or, more desirably, are made of separate components wherein the wheel seats 30 include a flange 32 portion opposite the conical face 34 for press fitting into the central opening of the bearing 10 cage. When combined in this manner, the wheel seats 30 are firmly held for rotation along axis 4 in relation to the wheel bearings 10 but are also easily pressed out of the wheel bearings 10 for removal, cleaning, repair, or replacement of either the wheel bearings 10 and the wheel seats 30, or both.

The combination of the wheel bearings 10 and wheel seats 30 relative to the wheel 5, frame 20, and side walls 22 is uniquely provided to perform the two axial functions which, when acting together, accomplish an omni-directional rotation of the wheel 5 together with a frictional bias in favor of the forward and backward motion over the a side-to-side motion. The wheel seats 30 are preferably made of, or at least coated with, a low friction polymer, such as polytetrafluoroethylene, that allows the wheel 5 to easily rotate against the conical faces 34. The formulation of the wheel seat 30 conical face 34 polymer is preferably determined relative to the formulation of materials used in the construction of the wheel 5 so as to achieve an optimum desired coefficient of static and kinetic friction parallel to wheel 5 and wheel seat 30 conical face 34 pairs of surfaces. The optimum coefficients of friction depend upon the size and skill of the skater, cost, riding surface, and the anticipated application of the wheel assembly 100. As described above, the wheel seats 30 preferably, but need not, include a flange 32. The flange 32 can be firmly pressed into the wheel bearing 10 cage central opening 12. Each wheel seat 30 has a conical face 34 opposite the flange 32. The conical faces 34 are disposed inwardly, relative to the central cavity of the frame 20, in opposite axial alignment along axis 4 to provide a contact area for mounting the wheel 5 between the side walls 22 of the frame 20. When combined, these features when acting separately operate in the following manner. First, the rotation of the wheel bearings 10 in combination with the wheel seats 20 about axis 4 and the exertion of a lateral normal force by the wheel bearings 10 and wheel seats 30 against the wheel 5 act to create a force of static friction which firmly holds the wheel 5 against the conical faces 34 of the wheel seats 30 to thereby create an axle for rotation of the wheel about axis 4 when the skater is performing in a forward or backward direction of travel. Second, upon exertion, by the skater, of a side-to-side (e.g., lateral) force relative to the riding surface, the magnitude of the normal force becomes insufficient to maintain the force of static friction below its maximum value, causing the wheel 5 to slide against the wheel seat 30 conical faces 34, a force of kinetic friction is exerted between the wheel 5 and the conical faces 34, and rotation of the wheel about axis 3 of FIG. 1 is achieved. The frictional bias in favor of the forward and backward motion over the side-to-side motion of the skater is accomplished through the use of the free-rolling roller-blade-wheel bearing 10 and the combination of these two functions. When acting in combination, omni-directional rotation of the wheel in relation to the frame is provided. The frictional bias not only operates to enable roller skaters, skate boarders, and scooter riders to easily skate in an in-line direction, but also to allow the skater to accelerate, brake, slow down, or stop by simply turning their skates on the riding surfaces in a direction which is transverse to the forward and backward direction of travel.

The load bearings may be of any kind which is well known, but preferably include a low friction roller bearing surface 40 circumferentially disposed about a support rod 45. Each end of support rod 45 is, in turn, connected in axial alignment to the side walls 20. The roller bearing surfaces 40 are preferably made of, or coated with, a low friction polymer. Once again, the polymer formulation is desirably based upon the preferred coefficients of friction between the wheel 5 and roller bearing surface 40 and/or the formulation of the conical faces 34 of the wheel seats 30, and considerations such as the specific application of the wheel assembly 100 including the desired performance, cost, and physical stature of the skater. The load bearings are supported between the side walls 22 of the frame 20 by a supporting rod 45 and the materials used for the rod 45 and side walls 22 must, when taken together, be of a construction which is sufficient to support the weight of the skater against the upward force exerted by the riding surface against the wheel 5. The number of load bearings is primarily driven by the individual user's performance needs. Similarly, the diameter of individual load bearings can be varied. Typically the diameter of load bearings depends upon the user's height and weight as well as the user's skill level and intended use.

Figure 6:
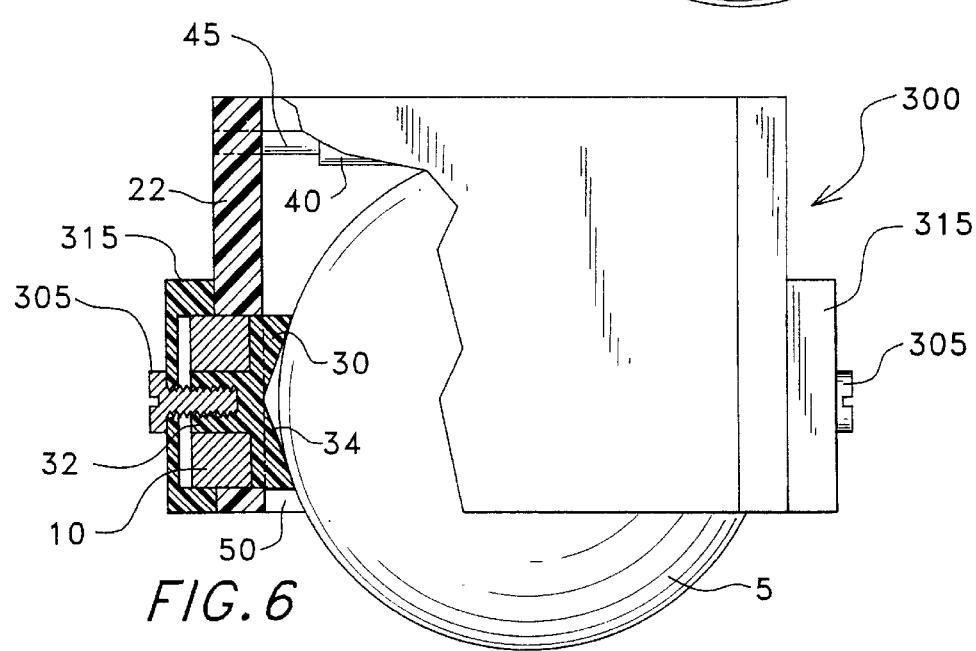
FIG. 6 is a cut-away side view of the embodiment shown in FIG. 1.

Referring now to the cross sectional illustrations of FIGS. 4 and 6, the omni-directional wheel may, but need not, include a guard ring 50 feature which is connected to circumscribe the lower portion of the frame 20 about the wheel 5. The guard ring 50 is useful to scrub the wheel of large pieces of dirt or debris which may be encountered under certain riding conditions. For example, a roller skater on a asphalt surface may encounter dirt and debris which could abrade the load bearing roller surfaces 40 and wheel seat 30 conical faces 34, or both. The guard ring 50 is preferably removable from the lower portion of the frame 20 and is manufactured of a compressible material such as felt or a low friction material such as nylon.

Figure 5:
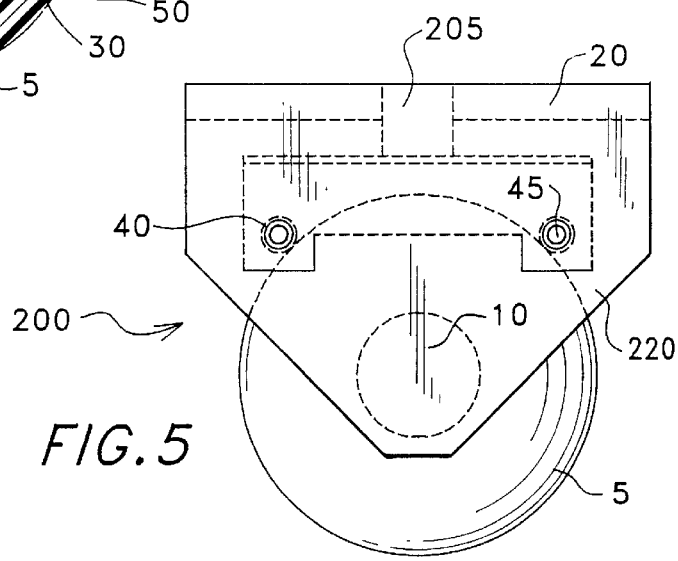
FIG. 5 is a side plan view of another embodiment of the invention.

FIG. 5 illustrates an alternative embodiment 200 where the load bearings may be connected to the frame 20 by attaching an isolated load bearing housing 210 to the frame 20 with a tension connector, such as a bolt, screw or spring (not shown). This feature is useful to adjust the force of the load bearings exerted against the wheel 5 in order to compensate for wear and tear which changes the circumference of the wheel 5. This feature is also desirable to facilitate any repair, removal or replacement of the load bearing rollers 40. As shown in the drawing figure, the load bearing housing 210 may be used in conjunction with a frame 20 design which incorporates tapered side walls 220. The tapered side walls 220 are desirable when the anticipated use of the roller assembly 200 includes either an entry or exit to an inclined surface. For instance, it may be desirable to use the tapered side walls 220 for the front and rear wheel assemblies of a roller blade skate 70 or skate board 80, as shown in FIGS. 7 and 8, respectively.

Turning now to FIG. 6, it is generally shown an embodiment of the invention 300 wherein the lateral tension of the wheel seats 30 is adjustable relative to the side walls 22 and the wheel 5. The invention may, but need not, include this feature. This feature is used to increase or decrease the normal force exerted by the wheel seat 30 conical faces 34 against the wheel 5. As shown in the drawing figure, a threaded connector 305, such as a screw, is threaded through the supporting members 315, which are connected to the side walls 22, of the frame 20, and into the wheel seat 30 flange 32 by means of hole drilled laterally through the support member 315 and wheel seat 30 flange 32. The holes are tapped to receive the threads of the connector 305. The connector 305, is supported to the side wall 22 by support member 315, so that, when turning the connector 305, the normal force exerted by the wheel seat 30 conical face 34 against the wheel 5 can be increased or decreased as needed to fit the user's particular performance requirements, changes in the configuration of the wheel 5 as a result of normal wear and tear against the riding surface, or to facilitate easy removal or replacement of the wheel seat 30 and wheel bearings 10, or both. Adjusting the tension of the wheel seat 30 conical faces 34 against the wheel 5 also facilitates the maintenance of a sufficient normal force of the wheel seat 30 conical faces 34 against the wheel 5 to ensure capture of the wheel 5 between the bearings 10. A spring (not shown) either circumscribing the screw or used in place of the threaded connector, may also be used for applying a tension of the wheel seat 30 conical faces 34 normal to wheel 5. Here, for example, the spring (not shown) could simply be located between the wheel bearing support member 315 and the wheel bearing 10. Once again, the selection and specific configuration of the adjusting means is largely a matter of design choice and dependent on the particular needs of the skater, desired application of the wheel, and factors such as cost versus performance and durability.

Figure 7:
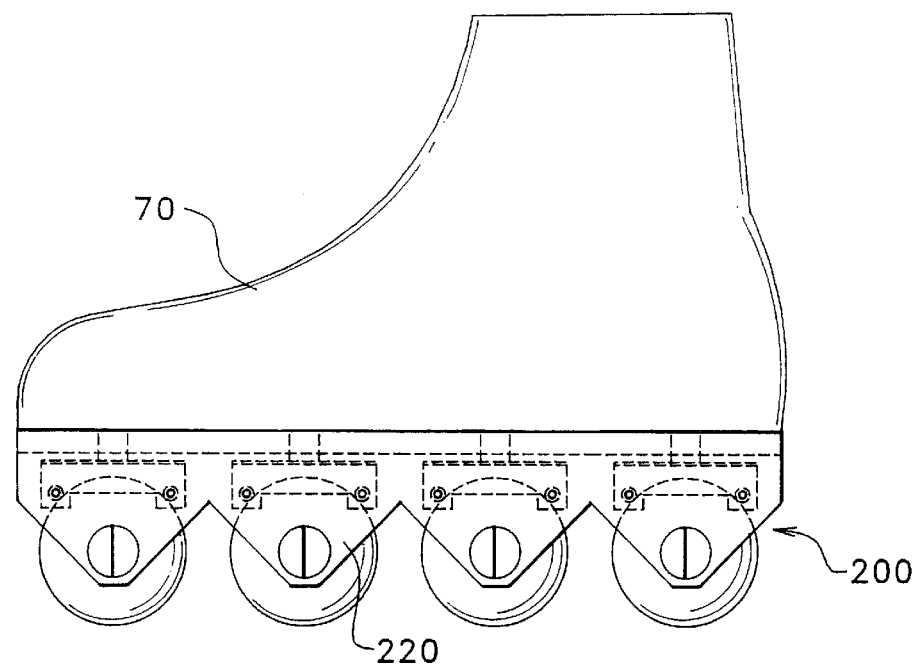
FIG. 7 is a side plan view of a roller hockey skate assembled in accordance with the present invention.
Figure 8:
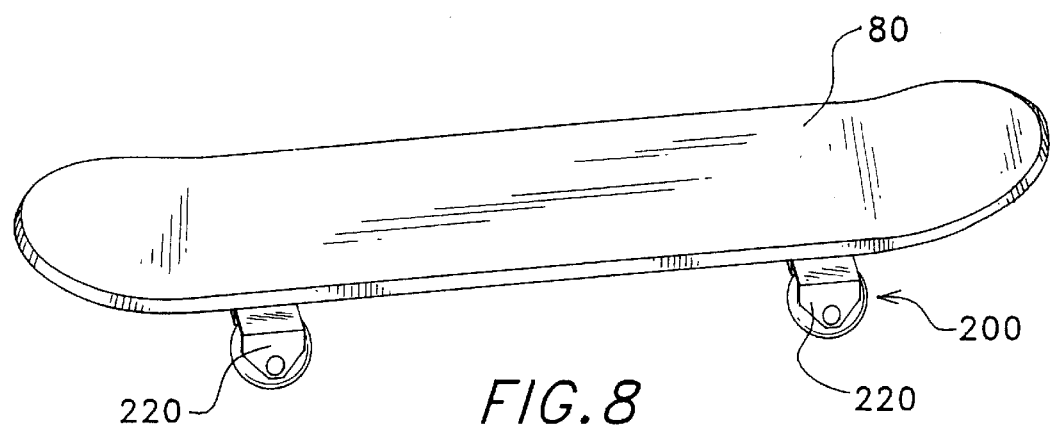
FIG. 8 is an isometric view of a skate board constructed in accordance with the present invention.

FIG. 7 is an illustration of the FIG. 5 embodiment of the invention attached to a skate boot 70. The skate boot 70 is fabricated according to standard practices which are well known in the art and can be made of any of a variety of materials. For example, the various components of a skate boot (e.g. ankle support, tongue, sole, toe, etc.) are typically made of a polymer, although cloth or nylon fabric elastomeric material, leather, and light-weight metal may also be used either singly or in combination. The primary considerations in designing the boot 70 are the intended user and the desired price. The present invention is intended for use with a boot 70 regardless of its design, although the manner in which the invention is attached to the boot 70 may vary depending upon both the boot's design and the intended user. Application of the omni-directional wheels 200 to the skate boot 70 enables a lateral breaking motion which is similar to that experienced by an ice skater when applying a lateral pressure to the skate to perform a "hockey stop". This motion causes the force of static friction between the wheel seat conical faces 34 to exceed its maximum and permit omni-directional movement of the wheel relative to the side walls 220. The force of sliding friction between the wheel seat 30 conical faces 34 and the wheel 5 may then be adjusted by increasing or decreasing the normal force, as above, to customize the lateral breaking feeling to be experienced by the intended user. Therefore, during linear motion the combination of the wheel bearings 10 and a static friction on the wheels 5 provides approximately the same amount of free rolling velocity as a conventional roller blade.

While the frictional bias has been described for use in breaking or slowing, it is also useful for acceleration. For example, when a skater needs to either initiate or accelerate a motion in a given direction, he or she will often apply force in the opposite direction by pushing away from or off of the rolling surface. The static and sliding frictional forces are required to apply such force. Additionally, as in the case of a conventional ice skate, the omni-directional frictional bias applies notwithstanding the fact that the skater's motion is perpendicular or angular to the riding surface.

Preferably the skate assemblies 100, 200, and 300 are used with a boot 70 in accordance with FIG. 7. It should be understood, however, the these skate assemblies can be used with other devices that presently utilize conventional wheel assemblies. For example, FIG. 8 illustrates one embodiment of the skate assembly 200, of FIG. 5, connected to the bottom surface of a skate board 80. Preferably in this embodiment each skate includes two roller assemblies (not shown) in the same construction as is well known in the art.

Other applications for the omni-directional wheels in accordance with the present invention are specifically contemplated herein. For example, the omni-directional wheels can be coupled with one or more surfaces of piece of luggage or pallet.

While the present invention has been described in connection with the illustrated embodiments, it will be appreciated and understood that modifications may be made without departing, from the true spirit and scope of the invention.

I claim:

1. An omni-directional wheel, comprising;
   (a) a frame including an upper portion for affixing the frame to an under-side of a weight bearing surface, at least two side walls, and a central cavity defined by the side walls for receiving at least one spherical wheel;
   (b) at least two wheel bearing means connected in axial alignment to the side walls for rotation of the wheel about affixed axis passing through the wheel bearing;
   (c) at least two wheel seat means each having one side connected in axial alignment to the wheel bearing means and an opposite conical face wherein the conical faces are disposed in opposite axial alignment for slidably mounting the wheel between the faces for rotation of the wheel about an axis perpendicular to the fixed axis,
   (d) an upper load bearing means connected to the frame which biases against an upper surface of the wheel; and
   (e) a means for adjusting a force of the conical faces against the wheel.

2. The wheel assembly according to claim 1 wherein the conical faces comprise polytetrafluoroethylene.

3. The wheel assembly according to claim 1 wherein the load bearing means comprises at least two cylindrical rollers connected between the side walls.

4. The wheel assembly according to claim 1 further comprising a guard ring connected to the frame and circumscribing the wheel.

5. The wheel assembly according to claim 1 wherein the load bearings are mounted in a load bearing housing which is connected to the frame.

6. The wheel assembly according to claim 1 wherein the side walls are tapered.

7. The wheel assembly according to claim 1 wherein the adjusting means comprises at least one threaded connector.

8. The wheel assembly according to claim 9 wherein the guard ring comprises felt or nylon.

9. The wheel assembly according to claim 5 wherein the load bearing housing is movable in relation to the frame by means of a threaded connector for adjusting a tension of the load bearings against the wheel.

10. A roller skate, comprising;
    (a) a skate boot and sole;
    (a) a frame including an upper portion for affixing the frame to the under-side of the sole, at least two side walls, and a central cavity defined by the side walls for receiving at least one spherical wheel;
    (b) at least two wheel bearing means connected in axial alignment to the side walls for rotation of the wheel about a fixed axis passing through the wheel bearing;
    (c) at least two wheel seat means each having one side connected in axial alignment to the wheel bearing means and an opposite conical face wherein the conical faces are disposed in opposite axial alignment for slidably mounting the wheel between the faces for rotation of the wheel about an axis perpendicular to the fixed axis, (d) an upper load bearing means connected to the frame which biases against an upper surface of the wheel; and (e) a means for adjusting a force of the conical faces against the wheel.

11. The roller skate according to claim 10 further comprising a guard ring connected to the frame and circumscribing the wheel.

12. The roller skate according to claim 10 wherein the load bearings are mounted in a load bearing housing which is movably connected to the frame using a spring or threaded connector.

13. The roller skate according to claim 10 wherein the side walls are tapered.

14. The roller skate according to claim 10 wherein the adjusting means comprises at least one threaded connector.

15. The roller skate according to claim 11 wherein the guard ring comprises felt or nylon.

* * * * *